United States Patent [19]

Beggs

[11] 4,344,066
[45] Aug. 10, 1982

[54] NOISE TRAP ARRANGEMENT FOR AC POWER LINE COMMUNICATION SYSTEMS

[75] Inventor: James H. Beggs, Clark County, Nev.

[73] Assignee: Robertshaw Controls Company, Richmond, Va.

[21] Appl. No.: 201,159

[22] Filed: Oct. 27, 1980

[51] Int. Cl.³ .......................................... H04M 11/04
[52] U.S. Cl. .............................. 340/310 A; 333/81 R; 340/538
[58] Field of Search ........ 340/310 A, 310 CP, 310 R, 340/538; 333/81 R

[56] References Cited

U.S. PATENT DOCUMENTS 3,204,245  8/1965  Dykaar ........................... 340/310 A
3,810,096  5/1974  Kabat et al. .................. 340/310 CP
4,130,861  12/1978  La Forest ...................... 340/310 R Primary Examiner—Glen R. Swann, III
Attorney, Agent, or Firm—Kokjer, Kircher, Bradley, Wharton, Bowman & Johnson

[57] ABSTRACT

A noise trap circuit which suppresses noise in a communication system of the type used in hotels and motels to transmit encoded communication signals such as room status information. The communication signals are transmitted on the neutral and ground lines of the AC power distribution network of the building. The noise trap circuit is an LCR circuit connected between the hot and neutral lines. The capacitor and inductor of the LCR circuit pass the communication signal band width, and the resistor has an impedance equal to the line impedance with the offending noise sources active. The communication system normally has a remote controller in each room of the building, and each remote controller is equipped with a noise trap circuit.

10 Claims, 4 Drawing Figures

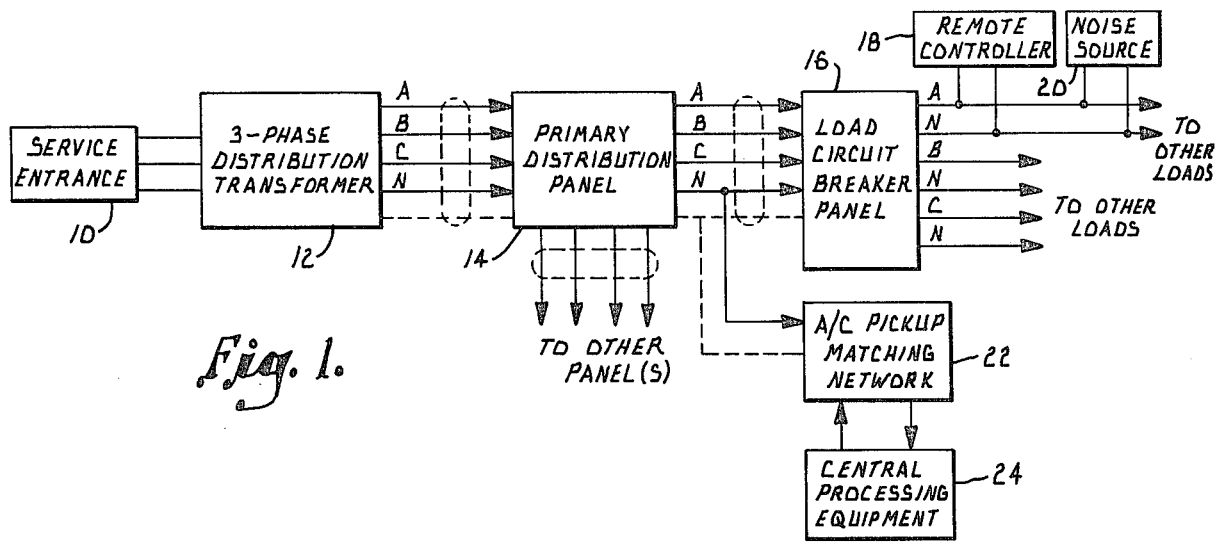
Fig. 1.
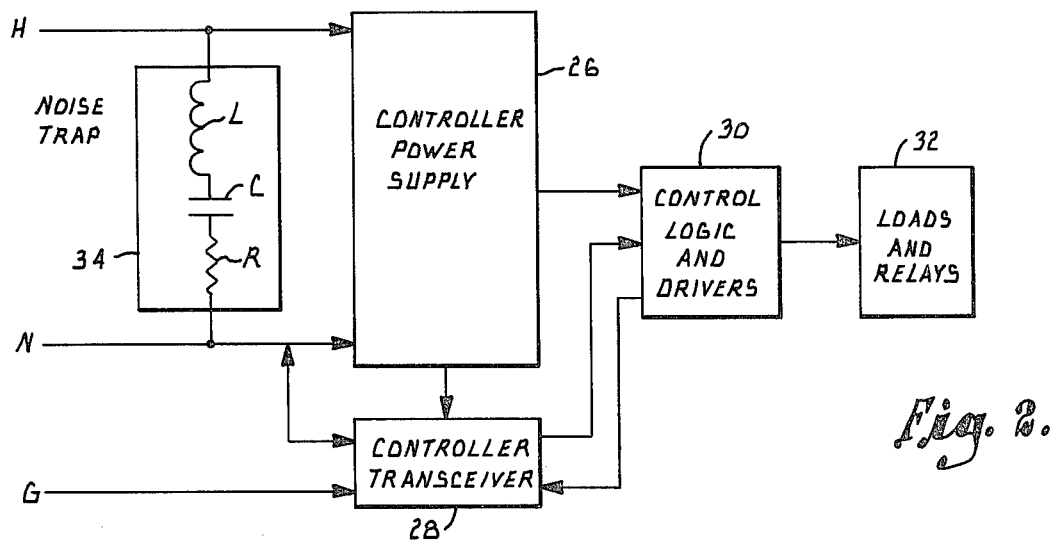
Fig. 2.
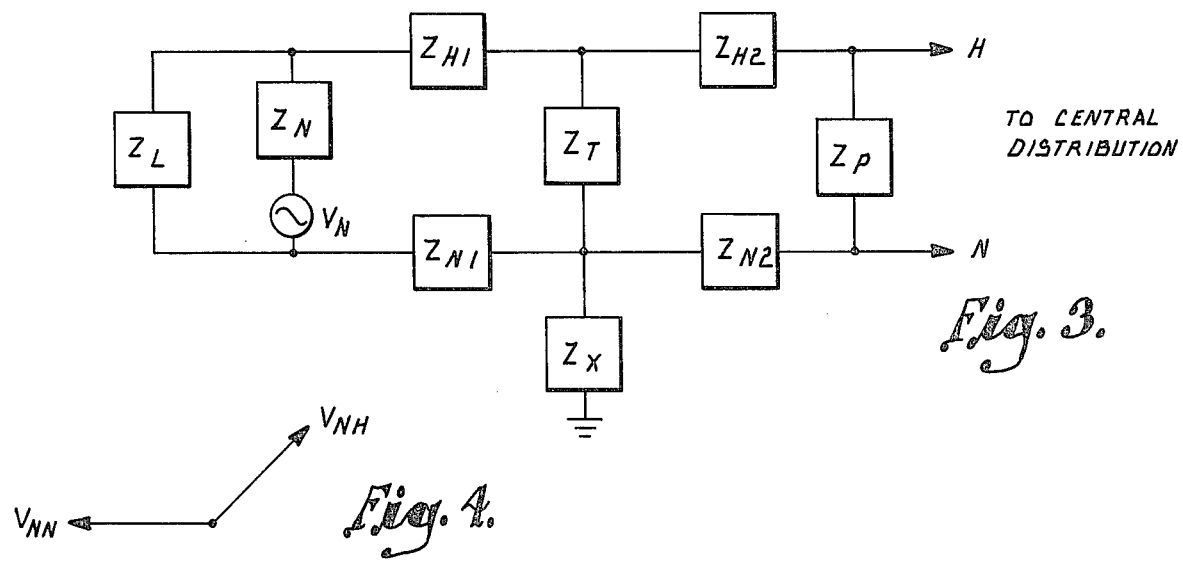
Fig. 3.
Fig. 4.

NOISE TRAP ARRANGEMENT FOR AC POWER LINE COMMUNICATION SYSTEMS

BACKGROUND AND SUMMARY OF THE INVENTION

This invention relates generally to a communication system which transmits signals on the neutral and ground lines of an AC power distribution network. More particularly, the invention relates to a noise trap circuit which is connected between the hot and neutral lines in order to improve the operation of the communication system.

U.S. Pat. No. 3,810,096 to Kabat, et al. and pending patent application Ser. No. 228,608 filed on Jan. 26, 1981 in the name of the same inventors (which application is a continuation of application Ser. No. 000,992, filed by the same inventors on Jan. 5, 1979 and now abandoned) disclose communication systems which operate in hotels and other buildings to transmit room status and related information on the existing lines of the power distribution network of the building. The system disclosed in U.S. Pat. No. 3,810,096 provides to the central desk area information concerning the status, price and availability of the various rooms of the hotel or motel. The system disclosed in the pending application is somewhat more versatile in that it permits two-way communication on the AC power lines between the central processing equipment and transceiver units which are located in the hotel rooms. Thus, inquiry can be made by the central processing equipment as to the status of a particular room or other area in the building or building complex. The benefits resulting from the use of these systems include reduced cost, improved service and increased convenience. Either type of system can be employed advantageously in hospitals, nursing homes, apartment complexes and other types of buildings as well as in hotels and motels. The communication occurs on the neutral and ground lines of the existing power distribution network, so there is no need for special additional wiring in new buildings or rewiring of existing buildings.

Although both types of communication systems have functioned well for the most part, the noise which is often present on the hot and neutral lines can interfere with the transmission of signals on the neutral and ground lines. In hotels and motels, the noise arises primarily from the operation of television sets, fluorescent lights, and electric razors and other devices powered by small electric motors. The present invention is aimed at reducing this noise on the hot and neutral lines in order to enhance the operation of the communication system.

In accordance with the invention, noise is reduced to a minimal level by installing noise traps between the hot and neutral lines of the AC power distribution network. Preferably, each noise trap circuit is an L-C-R series network connected across the hot and neutral lines and designed to absorb the most possible energy in the band of interest, i.e., the transmission band on the neutral and ground lines. The communication band width is typically about 20 kilocycles. For maximum noise attenuation, the resistor should have approximately the same impedance as the line impedance with the offending noise sources active. The reactive elements of the noise trap circuit should pass the communication signal band width. Although it is necessary for the circuit to include a capacitor if it is to effectively suppress the noise, the inductor can be eliminated in many cases without adversely affecting the noise trap.

In a preferred form of the invention, each transceiver which communicates with the power line is equipped with a noise trap. Since there is normally a transceiver in each hotel or motel room, the noise traps are distributed relatively uniformly throughout the building complex. Consequently, there is a noise suppressor physically near each offending noise source, and the noise can be effectively controlled due to the improved signal to noise ratio that results. In many cases, additional noise traps at selected locations in the building complex can enhance the overall quiteness of the power distribution network.

BRIEF DESCRIPTION OF THE DRAWING

In the accompanying drawings which form a part of the specification and are to be read in conjunction therewith and in which like reference numerals are used to indicate like parts in the various views:

FIG. 1 is a block diagram of a typical AC power distribution system which is equipped with a two-way communication system operating on the neutral and ground lines of the distribution network and showing the relative locations of the remote controllers, noise sources and central processing equipment;

FIG. 2 is a block diagram of one of the remote controllers in the communication system and showing the relative locations of the noise trap and transceiver;

FIG. 3 is a circuit diagram showing the relative impedances of the various components at high frequencies; and FIG. 4 is a phase diagram indicating generally out of phase relationships between the noise on the hot line and the noise on the neutral line of the power distribution network.

DESCRIPTION OF THE PREFERRED EMBODIMENT

Referring initially to FIG. 1, numeral 10 generally designates the service entrance which provides the connection from the utility system lines to the wiring system of a building such as a hotel, motel, hospital, nursing home, apartment complex, or other building or building complex. From the service entrance, the wiring system leads to a conventional three phase distribution transformer 12 having the three phases A, B and C together with the neutral line N. The primary distribution panel 14 connects with another panel or panels and supplies three phase lines A, B and C and a neutral line N. Numeral 16 designates the load circuit breaker panel having single phase power lines A-N, B-N and C-N which lead to the various loads in the building. A remote controller generally designated by numeral 18 is connected to the A-N single phase line, while the A-N line also receives noise from one or more noise sources which are collectively identified by numeral 20. An AC pickup matching network 22 is connected with a neutral line N and ground at a location between panels 14 and 16. The AC pickup matching network 22 transfers information to and from central processing equipment which is generally designated at 24.

The power distribution network is conventional, and the details of the remote controller 18 and the central processing equipment 24 are disclosed more specifically in pending patent application Ser. No. 000,992, filed Jan. 5, 1979 in the name of Jules M. Kabat and James H.

Beggs, which application is incorporated hereby by reference.

The noise trap arrangement of the present invention may also be used in a system of the type shown in U.S. Pat. No. 3,810,096, issued May 7, 1974 to Kabat, et al., which is also incorporated herein by reference.

FIG. 2 illustrates in block diagram form the arrangement of one of the remote controllers and the relative locations of the various components. The power supply 26 for the controller is connected between the hot line H and the neutral line N of the single phase AC power line. The transceiver 28 of the controller is connected between the neutral line N and the ground line G of the AC power line. The power supply 26 supplies power to the transceiver 28 and to the control logic and drivers 30 which also connect with the transceiver. The control logic and drivers also connect with loads and relays which are collectively identified by numeral 32.

In accordance with the present invention, a noise trap circuit 34 is connected between the hot line H and the neutral line N in order to suppress the noise which is present on the hot and neutral lines due to the operation of the noise source 20 (FIG. 1). In the preferred form of the invention, the noise trap 34 is an L-C-R series circuit connected between the hot and neutral lines and having an inductor L, a capacitor C and a resistor R. Although the presence of the capacitor and the resistor is necessary in order to effectively suppress noise on the hot and neutral lines, the inductor L can be eliminated in many cases without adversely affecting the noise suppression characteristics of the circuit.

The circuit diagram of FIG. 3 shows the relative impedances of the various components of the power distribution network at high frequencies. $Z_p$ represents the impedance of the panel, while $Z_T$ represents the impedance of the noise trap circuit and $Z_L$ represents the impedance of the load which is applied to the hot and neutral lines. $Z_N$ represents the impedance of the noise source 20. $Z_{H1}$ and $Z_{N1}$ represent the impedance on the hot and neutral lines, respectively, between the load and the noise trap, while $Z_{H2}$ and $Z_{N2}$ represent the impedances on the hot and neutral lines between the panel and the noise trap. $Z_x$ represents the impedance of the transceiver which is tied between the neutral line N and ground. The structure shown in FIG. 3 inherently results in there being a significant component of the hot line noise which is out of phase with the noise on the neutral line. This is shown diagrammatically in FIG. 4 and results in the noise trap effectively suppressing the noise on the hot and neutral lines.

It has been found that the noise suppression is maximized if the impedance of resistor R is approximately equal to the line impedance with the offending noise sources active. The capacitor C and inductor L (if present) should pass the communication signal band width which is typically about 20 kilocycles. The distribution system normally appears inductive at ultrasonic frequencies, and the inductance is directly proportional to the distance along the power distribution system. Interferring signals will thus drop with distance, as will desired signals. Therefore, an improvement in the signal to noise ratio requires that the noise suppressors be physically near the noise sources. In hotels and motels, where a remote controller 18 is normally located in each room, sufficient quieting of the power network of the building can be achieved by equipping each of the controllers 18 with a noise trap 34. This results in the noise traps being distributed relatively uniformly in the building and along the power distribution system, so that a noise suppressor will be physically located near each potential source of noise. In addition, supplementary noise traps at other selected locations can at times be helpful in achieving a general quieting of the power network. If the additional noise suppressors are located where they can counteract the effect of failure in one or more of the noise traps associated with the controllers, the overall reliability of the noise suppression system can be enhanced substantially.

In actual practice, significant improvement in the suppression of noise on the hot and neutral lines (and corresponding improvement in the transmission of communication signals on the neutral and ground lines) is gradually achieved as additional controller units are brought on line. In a modern hotel or motel having a large number of rooms, substantial improvement in communication is noted when the final units are made operational, due to the large number of noise traps which are present in the multiroom hotel or motel complex. In this situation, the communication signals passing to and from the remote controllers are improved in clarity without the need for supplementary noise traps.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention I claim:

1. In a communication system operable to transmit encoded room status information and other data on neutral and ground lines included in an AC power line which also includes a hot line and which extends between separate areas in a building complex such as the rooms of a hotel, motel, or hospital, the improvement comprising noise trap means connected between the hot and neutral lines of the AC power line for attenuating noise on the hot and neutral lines.

2. The improvement set forth in claim 1, wherein said noise trap means includes a plurality of noise trap circuits connected between the hot and netural lines at spaced apart locations along the length of the AC power line, each noise trap circuit being operable to attenuate noise on the hot and neutral lines to enhance the data transmission on the neutral and ground lines.

3. The improvement as set forth in claim 1, wherein said noise trap means comprises a circuit having a capacitor and a resistor connected between the hot and neutral lines.

4. The improvement set forth in claim 3, wherein the impedance of said resistor is approximatley equal to the total impedance of the hot and neutral lines.

5. The improvement set forth in claim 3, wherein said circuit includes an inductor connected between the hot and neutral lines.

6. The improvement set forth in claim 5, wherein said inductor and capacitor pass the band width of the signals transmitted on the neutral and ground lines.

7. In a communication system for transmitting encoded room status information and other data on neutral and ground lines included in an AC power line which also includes a hot line and which extends between separate areas of a potentially noisy building complex such as a hotel, motel, or hospital, the combination of:

central processing equipment operable to transmit encoded signals thereon;

a transceiver in each of said separate areas, each transceiver being operable to receive encoded signals on the neutral and ground lines from the central processing equipment and to transmit encoded signals to said equipment on the neutral and ground lines, whereby two-way communication is provided between said central processing equipment and each transceiver; and a noise trap for each transceiver connected between the hot and neutral lines of the AC power line and operable to attenuated noise on the hot and neutral lines.

8. The combination set forth in claim 7, wherein each noise trap comprises a circuit connected between the hot and neutral lines and including a resistor and a capacitor.

9. The combination set forth in claim 8, wherein the impedance of said resistor is approximately equal to the total impedance of the hot and netural lines in a condition wherein the noise is maximum.

10. The combination set forth in claim 9, wherein said circuit includes an inductor connected in series with the resistor and capacitor, said inductor and capacitor passing the band width of the signals transmitted on the neutral and ground lines.

* * * * *